(12) United States Patent
Norrman et al.

(10) Patent No.: US 11,232,718 B2
(45) Date of Patent: Jan. 25, 2022

(54) METHODS AND DEVICES FOR PROTECTING DATA

(71) Applicant: TELEFONAKTIEBOLAGET LM ERICSSON (PUBL), Stockholm (SE)

(72) Inventors: Karl Norrman, Stockholm (SE); Elena Dubrova, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 196 days.

(21) Appl. No.: 16/480,798

(22) PCT Filed: Feb. 1, 2017

(86) PCT No.: PCT/EP2017/052130
§ 371 (c)(1),
(2) Date: Jul. 25, 2019

(87) PCT Pub. No.: WO2018/141378
PCT Pub. Date: Aug. 9, 2018

(65) Prior Publication Data
US 2019/0385489 A1    Dec. 19, 2019

(51) Int. Cl.
| G09C 1/00 | (2006.01) |
| G06F 21/64 | (2013.01) |
| H04L 9/06 | (2006.01) |
| H04L 9/08 | (2006.01) |
| H04L 9/32 | (2006.01) |

(52) U.S. Cl.
CPC .............. *G09C 1/00* (2013.01); *G06F 21/64* (2013.01); *H04L 9/0631* (2013.01); *H04L 9/0869* (2013.01); *H04L 9/3278* (2013.01)

(58) Field of Classification Search
None
See application file for complete search history.

(56) References Cited

U.S. PATENT DOCUMENTS

| 9,225,512 | B1* | 12/2015 | Trimberger | ........... H04L 9/0866 |
| 2013/0142329 | A1* | 6/2013 | Bell | ....... H04L 9/0877 380/44 |
| 2015/0278505 | A1 | 10/2015 | Lu et al. | |
| 2016/0364583 | A1 | 12/2016 | Benoit et al. | |
| 2018/0152306 | A1* | 5/2018 | Lu | ............ G09C 1/00 |

FOREIGN PATENT DOCUMENTS

| WO | 2008152547 A1 | 12/2008 |
| WO | 2010060005 A2 | 5/2010 |
| WO | 2012154409 A2 | 11/2012 |
| WO | 2016042287 A1 | 3/2016 |

OTHER PUBLICATIONS

International Search Report and the Written Opinion of the International Searching Authority, issued in corresponding International Application No. PCT/EP2017/052130, dated Oct. 26, 2017, 12 pages.

* cited by examiner

*Primary Examiner* — Eleni A Shiferaw
*Assistant Examiner* — Bassam A Noaman
(74) *Attorney, Agent, or Firm* — Rothwell, Figg, Ernst & Manbeck, P.C.

(57) ABSTRACT

A method performed by a device for protecting data is provided. The method comprises inputting, to a Physically Unclonable Function, PUF, of the device, a challenge; obtaining, from the PUF, a response; and protecting the data by using the response. A device, a method in an encryption unit, computer program and computer program product are also provided.

7 Claims, 3 Drawing Sheets

METHODS AND DEVICES FOR PROTECTING DATA

CROSS REFERENCE TO RELATED APPLICATION(S)

This application is a 35 U.S.C. § 371 National Phase Entry Application from PCT/EP2017/052130, filed Feb. 1, 2017, designating the United States, the disclosure of which is incorporated herein by reference in its entirety.

TECHNICAL FIELD

The technology disclosed herein relates generally to the field of data communication, and in particular to methods for protecting data, a device, computer program and computer program product are also provided.

BACKGROUND

There are many scenarios in which there is a need for protecting data, and methods may be used for encrypting data using a secret key which is known only to the user protecting the data. FIG. 1 illustrates an example of such scenario. A user wishes to store data on an untrusted storage, such as, for instance, an external hard-drive or storage in a cloud environment. A sealing device and an encryption key are used for encrypting the data when sending it to the untrusted storage. Once access to the data is required, the data is decrypted using the same sealing device.

A well known method that uses sealing and binding is provided by the Trusted Platform Module (TPM) specifications. They specify how a TPM can generate and store keys to be used for sealing of data. The keys are stored in the TPM and it is realized that the storage needs to be tamper-resistant in order to prevent attackers from obtaining the key used for the sealing operations and using it to decrypt the sealed data. However, the TPM specifications do not define how to protect the storage (and thus key) in the TPM, and such protection requires costly technology.

An example of a technology for protecting the storage is mask-layering of a chip running the TPM functions. Another is to use eFuses to store so-called fuse keys, which are "blown" by software and then used. The latter is useful when keys are not going to be updated. Still other methods use sealing on fuse keys for ensuring tamper-resistant storage of the sealing keys.

The prior art has some drawbacks. One drawback is, as described above, that the keys used for encryption/decryption requires tamper-resistant storage, and such storage is expensive. Another drawback is that the sealing keys are entered into the sealing device, which means that they are known to at least one party, and that party has to be trusted by the user of the sealing device.

SUMMARY

An objective of the present disclosure is to address and improve various aspects for protecting data. A particular objective is to enable tamper-resistant encryption and/or decryption of data. This objective and others are achieved by the methods, devices, computer programs and computer program products according to the appended independent claims, and by the embodiments according to the dependent claims.

The objective is according to an aspect achieved by a method performed by a device for protecting data. The method comprises inputting, to a Physically Unclonable Function (PUF) of the device, a challenge; obtaining, from the PUF, a response; and protecting the data by using the response.

The method provides many advantages, such as, for instance, an efficient, tamper-resistant and fault-tolerant way of implementing an encryption black-box.

The objective is according to an aspect achieved by a computer program for a device for protecting data. The computer program comprises computer program code, which, when run on at processing circuitry of the device causes the device to perform the method as above.

The objective is according to an aspect achieved by a computer program product comprising a computer program as above and a computer readable means on which the computer program is stored.

The objective is according to an aspect achieved by a device for protecting data. The device is configured to: input, to a Physically Unclonable Function (PUF) of the device, a challenge; obtain, from the PUF, a response, and protect the data by using the response.

The objective is according to an aspect achieved by a method performed by an encryption unit for use in protecting data. The encryption unit comprises a Physically Unclonable Function (PUF). The method comprises receiving, in the PUF, a challenge; producing, based on the challenge, a response; and providing the response for use in protecting data.

Further features and advantages of the embodiments of the present teachings will become clear upon reading the following description and the accompanying drawings.

DETAILED DESCRIPTION

Figure 1:
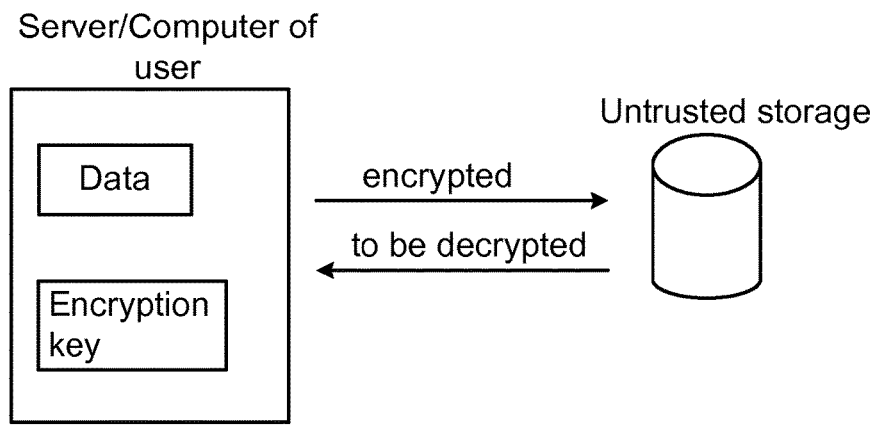
FIG. 1 illustrates an encryption-decryption scenario.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In order to provide a thorough understanding of the present teachings, some aspects of Physically Unclonable Functions (PUFs) are given in the following.

A PUF is a physical entity embodied in a physical device (e.g. an integrated circuit, IC, or chip) which exploits the inherent process variations in the physical device to produce a response which is easy to compute by the PUF, but hard to predict for a PUF-external entity. Furthermore, an individual PUF is expected to be easy to manufacture, but practically impossible to duplicate, even if repeating the manufacturing process that fabricated the PUF. Since various parameters, e.g. temperature, material impurities, etc. may vary during the manufacturing the individual PUFs are affected differently and therefore impossible to duplicate.

In a general setting, and from a computational perspective, a PUF implements a random mapping, i.e., it generates a response RES to a given challenge R. Without access to the PUF it is practically impossible to predict which RES corresponds to which R. If implemented properly, a PUF of a given device/chip is expected to provide the same response to a same challenge, at least within an expected boundary on the number of erroneous bits in the response (due to that some bits may flip). There are known methods on how to design reliable PUFs and how to correct (or to tolerate) errors in its output responses.

PUFs have been proposed as a low-cost cryptographic primitive for device identification, challenge-response authentication, and secret key generation. Compared to conventional key storage approaches based on memories, PUFs are claimed to provide a higher level of tamper-resistance against invasive attacks. This is because the response of a PUF is likely to change when a PUF is tampered with.

Most PUF Integrated Circuits (ICs) developed up to now can be divided into two categories: delay-based (e.g., ring oscillator PUFs and arbiter PUFs) and memory-based (e.g., SRAM (Static Random-Access Memory) PUFs). In the description, the former (delay-based PUFs and specifically arbiter PUFs) are used for describing various embodiments.

PUFs can be sub-divided in modellable and non-modellable PUFs. For a modellable PUF, there exists a model whose description size is (considerably) smaller than the size of the mapping implemented by the PUF. For example, an n-input arbiter PUF is fully described by the delays of its n stages, which are 2 per stage (composed of delays of logic elements and interconnect), or 2n delays in total. There is an even smaller model of an arbiter PUF, based on differences on delays of individual stages. It uses n+1 delay differences to model an n-stage arbiter PUF.

For non-modellable PUFs, no model exists whose description size is (considerably) smaller than the size of the mapping implemented by the PUF.

Modellable PUFs have some advantages and some disadvantages. A great advantage of modellable PUFs is that there is no need to pre-compute and store a set of challenge-response pairs (R, RES) to be used for challenge-response authentication when the PUF is manufactured and before it is deployed. For non-modellable PUFs, this in necessary, since there is no other way of verifying is the response generated by a PUF is a valid response or not. Moreover, the pairs are a finite resource that will eventually be depleted. For modellable PUFs, the verifier who knows the PUF model can simulate the response of a PUF for any randomly selected challenge. This eliminates the need of a (large) database and/or a mechanism for updating the set of challenge-response (R, RES) pairs once the database is exhausted. However, it is noted that for the methods and means according to the present teachings, the use of non-modellable PUFs bring no disadvantages since no one else but the encryption black-box needs to know the PUF responses.

A disadvantage of modellable PUFs is their susceptibility to so called modelling attacks in which an adversary who can observe a large number of challenges and responses of a PUF can apply, e.g. machine learning techniques, to create a model of the PUF. Once a model is created, the adversary can simulate the response to any challenge. To avoid modelling attacks, the responses of a modellable PUF should be protected using some cryptographically secure technique.

Figure 2:
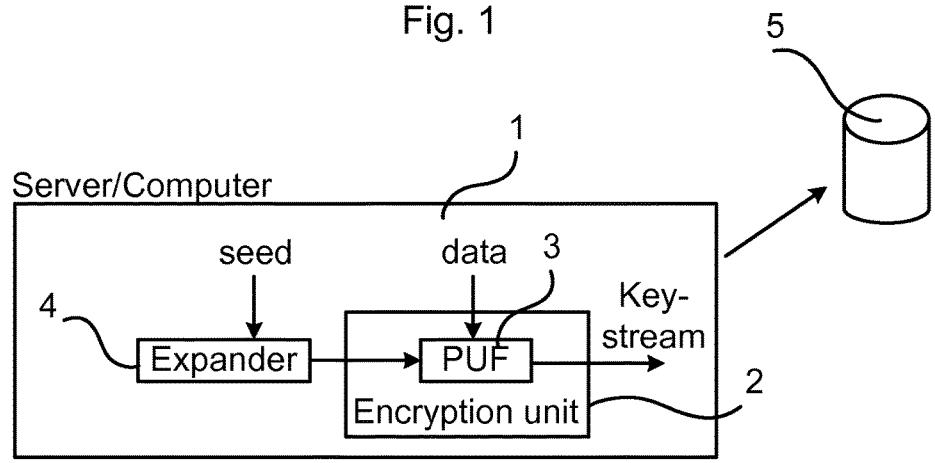
FIG. 2 illustrates use of an encryption black-box according to embodiments of the present teachings.

FIG. 2 illustrates embodiments of an encryption black-box 2 and use thereof, according to the present teachings. The present teachings provide methods and means for protecting data, wherein a message/data is encrypted and/or integrity protected using a secret key which is not known to anyone (besides the device used for protecting the data). In this description, the term "sealing" (sealing data) is used and means that data is encrypted and/or integrity protected. Correspondingly, a sealing device is a device used for protecting the data, i.e. for encrypting and/or integrity protecting the data. The usage of such methods comprises, for instance, encrypting data using a sealing device, and storing the data on e.g. an untrusted storage 5, such as an external hard-drive or cloud environment storage. The herein provided sealing device is an encryption unit 2 and is also referred to as an encryption black-box 2. Once access to the data is required, the data is decrypted using the encryption unit 2 (encryption black-box) again.

Briefly, use is made of Physically Unclonable Functions (PUFs) 3 for implementing the encryption unit 2. It is noted that while describing PUFs in the following, one or more PUFs 3 may be used, although described as implemented by one PUF for simplicity, it may be implemented as several PUFs. That is, the constructing of a PUF may comprise using a single PUF or by combining multiple PUFs in parallel.

The encryption unit 2 is a device which can encrypt messages which cannot (for all practical purposes) be decrypted by anyone else except the encryption unit 2 itself. According to the present teachings, the PUF 3 plays two roles: as a secret key which is known only to the encryption black-box 2 which comprises the PUF 3 and as a keystream generator, more specifically a stream cipher. By using the PUF 3 as secret key, there is no need for including expensive tamper-resistant storage for storing the secret key(s).

While sealing (and the closely related function binding) often comprise more elaborate functions, such as a sealing/binding data to identifiers or state registers of the encryption black-box, focus in this description is on the encryption part.

The provided method comprises two main parts: a method for black-box encryption/decryption and a method for integrity protecting the data (effectively binding it to the given black-box in a way that can be quickly verified). Both parts rely on one or more PUFs. A client who wishes to encrypt data provides the encryption unit 2 with the data and optionally a seed. Similarly, a client who wishes to decrypt data previously encrypted by the encryption unit 2 provides the encryption unit 2 with the encrypted data and optionally the corresponding seed. The encryption unit 2 can thus be seen as implementing a black-box encryption.

The encryption unit 2 may, for instance, be provided in a computer or server 1 of a user. A seed (possibly public) is supplied by the user, or generated internally by the encryption unit 2. The seed may first be expanded in an expander 4 into a sequence of challenges and then fed into the PUF 3. The PUF 3 generates responses for each challenge which are concatenated into a keystream. The keystream, possibly post-processed, is combined with a plaintext message (i.e. message to be encrypted, not shown in FIG. 2) to produce the resulting cipher text, e.g. by a bitwise XOR. Only the encryption unit 2 which physically comprises the PUF 3 can then decrypt the resulting cipher text, because the PUF responses are unique for a given PUF chip and since PUFs are unclonable. Therefore, no one else has a copy of the random mapping represented by the PUF 3. Hence, even if the manufacturer of the chip containing the PUF 3 is not trustworthy and tries to record a large database of challenge-response pairs for each individual chip, it is not possible to record all pairs for a PUF 3 which accepts 128-bit challenges since there are $2^{128}$ possible challenge-response pairs.

PUFs are prone to errors, and therefore an N-modular redundancy is used in some embodiments in order to tolerate keystream faults, a technique that suits the black-box encryption application well.

Figure 3:
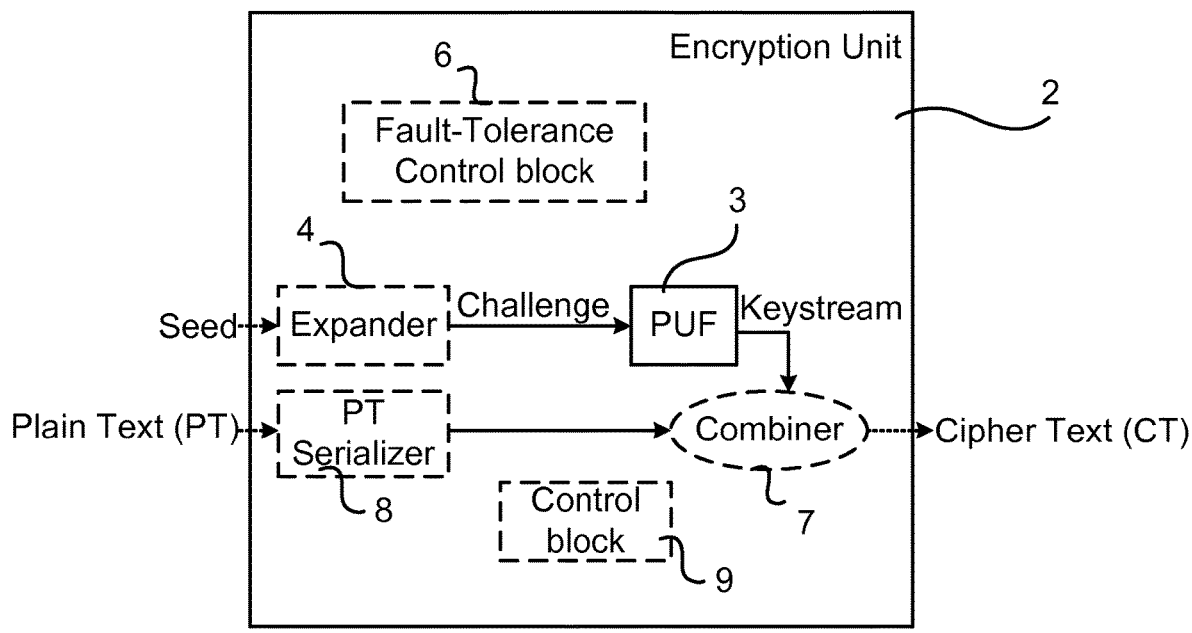
FIG. 3 illustrates embodiments of an encryption black-box according to embodiments of the present teachings.

FIG. 3 illustrates in more detail embodiments of an encryption unit according to embodiments of the present teachings.

In FIG. 3, the boxes indicated by dashed lines may, but need not, be part of the encryption unit 2. The encryption unit 2 comprises at least the PUF 3 (which in turn may be implemented as a single PUF or several PUFs in parallel). In the embodiment shown in FIG. 3, the user provides a seed which is expanded in an expander 4 (e.g. a Linear Feedback Shift Register, LFSR), into a sequence of challenges input to the PUF 3. The PUF 3 produces a response for each challenge which are concatenated and used as a keystream to encrypt the plain text message. The plain text message and the keystream are input to a combiner 7, which outputs the cipher text. The plain text message and the keystream can be combined, for example, by bitwise-XOR.

The seed can be expanded into a sequence of challenges in many different ways. For example, if an n-bit input single-bit output PUF is used, then a k*n-bit keystream can be produced by feeding the initial seed into a pseudo-random number generator (not necessarily cryptographically secure), e.g. a LFSR, and using the LFSR to generate a sequence of k n-bit challenges which are applied to the PUF 3. Since the security strength is provided by the "built in key" in the PUF 3, the sequence of challenges can be as simple as 1, 2, 3, . . . . The single bit responses generated by the PUF 3 constitute the keystream.

The encryption unit 2 (or device 1 comprising the encryption unit 2) may further comprise a plain-text serializer 8 for ensuring that the seed and the plain-text have equal number of bits. That is, the keystream output from the PUF 3 should have as many bits as the plain-text output from the serializer 8.

The encryption unit 2 (or device 1 comprising the encryption unit 2) may further comprise a control block 9 for controlling the number of times a particular seed is to be repeated.

The encryption unit 2 (or device 1 comprising the encryption unit 2) may further comprise a fault-tolerance control block 6 for handling e.g. bit errors of the PUF 3. The PUFs occasionally produce transient (non-permanent, soft) errors. If a non-modellable PUF which is not enrolled is used, it is not possible to use error-correcting methods based on error-correcting codes and helper data. In order to solve this, N modular redundancy is used in some embodiments in order to tolerate faults in the keystream during encryption/decryption. Two cases, described next, are possible. The corresponding methods implementing these cases may be implemented using the fault-tolerance control block 6 and the control block 9.

Case 1:

Encryption: N keystreams are generated by the PUF 3 from the same seed. A majority voting is applied to these N keystreams in order to correct faults. The keystream produced by voting is used to encrypt the plaintext and the cipher text may then be stored.

Decryption: N keystreams are generated by the PUF 3 from the seed used for encryption. Majority voting is applied to these N keystreams to correct faults. The keystream produced by voting is used to decrypt the stored cipher text.

Case 2:

Encryption: N keystreams are generated by the PUF 3 using N different seeds. The plaintext is encrypted N times using these keystreams. The resulting N cipher texts are stored.

Decryption: N keystreams are generated by the PUF 3 from the N seeds used for encryption. Each of the N stored cipher texts is decrypted using the corresponding keystream. Majority voting is applied to the resulting N plaintexts to correct faults.

The above second set of embodiments (i.e. Case 2), using different keystreams, might provide a stronger protection against common-mode faults. Hence, if a PUF 3 has a tendency to produce an erroneous bit in a certain position for a certain challenge, this method may be preferable to the first.

It is noted that if the PUF 3 is non-modellable, then the keystream from the PUF 3 may be used directly. However, if the PUF 3 is modellable, then it is preferable to protect the keystream, for example, by hashing it (partitioned into suitable blocks). Since hashing is likely to increase the number of faults, if the above Case 1 is used (i.e. using a single seed N times), it is preferable to correct faults in the keystream before hashing it.

The present teachings also provide methods for protecting the integrity of data using the encryption unit 2, which may also be seen as implementing black-box integrity protection. A client may protect the integrity of data using the encryption unit 2 and store an integrity protection tag in the encryption unit 2 or separately outside the encryption unit 2. Later, when the client wishes to verify whether a piece of data has been altered or not, the client computes the integrity protection tag again using the encryption unit 2 and compares the result to the previously stored result. If they match, e.g. if they are the same possibly with some error margin, then the data has not been altered.

This is achieved by feeding the encryption unit 2 with data to be protected. The encryption unit 2 then partitions the data into blocks having the same size as the input to the PUF 3 and applies the PUF 3 to each block in succession. The encryption unit 2 hence compresses the input data to the size of the output of the PUF 3. Effectively, the PUF 3 can be viewed as acting as a compression function of a Message Authentication Code (MAC) and can then be used for example in an keyed-hash MAC (HMAC) construction. The PUF compression algorithm can be defined as follows:

Input: x

1. Partition x into blocks the same size as the input to the PUF 3
2. Apply the PUF 3 to each block b_i to obtain corresponding output o_i.
3. Combine the sequence of o_i into a single value, e.g., by conventional key-less hashing (e.g., using Secure Hash Algorithm 256, SHA-256).

Output: the combined value from step 3.

The PUF compression algorithm can be used as a compression function in HMAC. A HMAC uses a compression function h and a key to integrity protect a piece of data x according to following:

HMAC(x,k):=h(k xor OPAD||h(k xor IPAD||x))

Where || denotes concatenation, and OPAD and IPAD are two different constants.

The PUF 3 compression algorithm provides key-mixing together with the compression step for each block b_i, in the sense that the PUF 3 itself is viewed as a keyed compression function. Because of this, it can then be used in a simpler form, PMAC according to ("PUF compression algorithm" abbreviated as PC):

PMAC(x)=PC(PC(x))

It is noted that the security model here is that the encryption black-box 2 is the only entity that has access to the inner workings of the PUF 3, and extension attacks are thereby not possible. That is, if an attacker wants to fool the encryption black-box into accepting a piece of data that the attacker has appended or prepended some data to, the attacker would not be able to calculate the effect this has on the integrity protection tag for two reasons: the attacker does not have the key nor the algorithm that the PUF constitutes. Because of this, the PMAC formula can be even further simplified to merely:

PMAC'(x)=PC(x)

It might be desirable to include measures for detecting PUF's failures due to random faults or malicious tampering. Such measures may, for instance, be implemented in the fault-tolerance control block 6. A random fault can occur for a variety of reasons, e.g. edging, or exposure to radiation. A few possible problems are mentioned in the following.

1) The PUF 3 can be tampered with to always give the response 000 . . . 0. As a result, the same output is generated.

2) The PUF 3 is damaged or gets out of function and as a result it does not generate any output.

One possibility for solving both problems is to use runtime health checks which perform monitoring of output generated by PUF online, while the system is running, to detect that they are not stuck to a given value, or more generally that they have a required minimum of entropy. Such health checks are used for monitoring the entropy source of true random number generators (RNG), and the techniques for implementing them are well-known and can be directly adopted to PUFs. Health checks can take different forms. Federal Information Processing Standards (FIPS) 140 series, for example, mandates that all approved RNGs use a runtime health check that verifies the generator has not become 'stuck', i.e., is generating the same numbers over and over again.

To summarize, in various embodiments described herein PUFs are used as keystream generators and Message Authentication Codes (MACs). Using them as key stream generators may not work directly because PUFs produce transient (non-permanent, soft) errors occasionally. As a solution, errors in the keystreams may be corrected by majority voting. In addition, the PUF 3 may be used as a keyed compression function to produce a MAC. The MAC can be used to bind data to the hardware containing the PUF. Another feature is that a PUF 3 is used as both a stream cipher and a key. This is an important advantage as it can be used for data sealing (i.e. protection in form or encryption and/or integrity protection) and there is no need for assuring tamper-resistance by some extra means since PUFs are tamper-resistant by their nature.

The various embodiments and features thereof may be combined in many different ways, examples of which are given in the following with reference first to FIG. 4.

Figure 4:
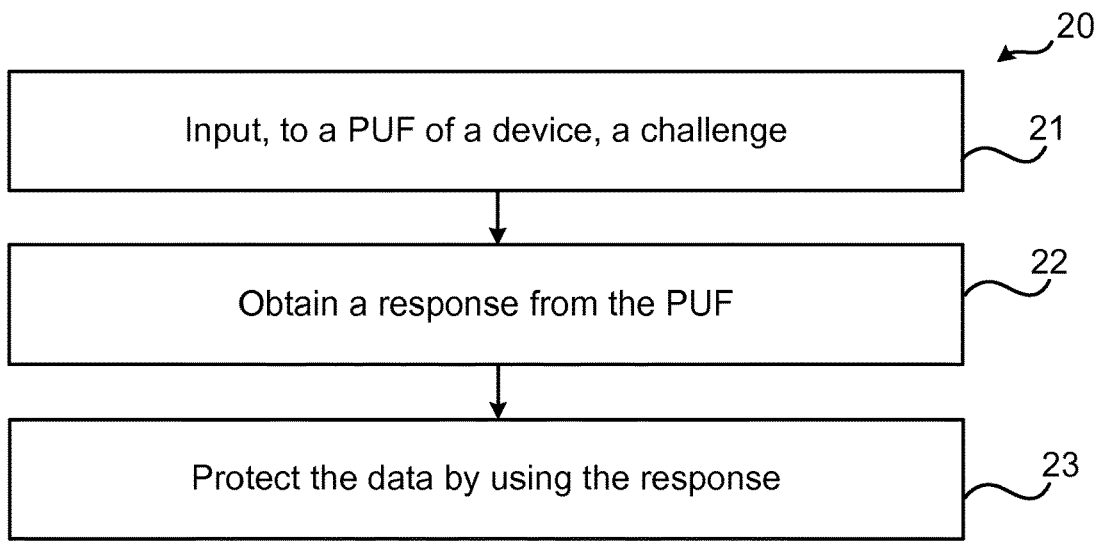
FIG. 4 illustrates a flow chart over steps of embodiments of a method in a device in accordance with the present teachings.

FIG. 4 illustrates a flow chart over steps of an embodiment of a method in a device, which may be seen as an encryption black-box, in accordance with the present teachings.

The method 20 may be performed by a device 1 for protecting data. The device 1 may be any type of device for which data needs to be protected. The device 1 may, for instance, be a computer the user of which wants to store data in an external (untrusted) storage. The method 20 comprises inputting 21, to a Physically Unclonable Function, PUF, 3, of the device 1, a challenge.

The method 20 comprises obtaining 22, from the PUF 3, a response.

The method 20 comprises protecting 23 the data by using the response.

The method 20 provides an efficient, tamper-resistant and fault-tolerant way of implementing an encryption black-box. An important advantage of the method is that it is tamper-resistance. There is no external person (e.g. service provider) that has a copy of the encryption key in some non-volatile form (i.e. that exists after the power is turned off). On one hand, the device 1 which possesses the PUF physically can compute the response of the PUF on-the-fly for any given challenge and use it to encrypt/decrypt messages only while the power is on. Once the power is turned off, there is no explicit copy of the encryption key in the device. In is not possible to attack a PUF by measuring its signals while the power is on, because the response of the PUF is likely to change when a PUF is tampered with. Another advantage of the method 20 is its ability to tolerate transient faults in PUF responses by means of N-modular redundancy. If a PUF is not enrolled, it is not possible to use the error-correcting methods based on error-correcting codes and helper data (providing information on how to correct an erroneous message). Yet another advantage of the method 20 is the ability to encrypt long messages (or large amount of data), since PUF is turned into a stream cipher. Still another advantage is that the PUF can also be used to bind the encrypted data to the PUF by producing a message authentication code (MAC) using the PUF as a compression function.

In an embodiment, the method 20 as claimed in claim 1, comprising, before the inputting 21, receiving a seed and expanding the seed into the challenge. The seed may, as has been described e.g. in relation to FIG. 3, be input by a user. The input seed is received in an expander 4 and expanded into a challenge, which is subsequently input to the PUF 3.

In a variation of the above embodiment, the obtaining 22 is repeated N times for the seed providing N responses, and the method 20 comprises, before the protecting 23, using the N responses to correct faults and to provide based thereon the response.

In some embodiments, the method 20 comprises repeating the inputting 21 N times for different seeds, and the obtaining 22 comprises obtaining N responses, and wherein the protecting 23 comprises encrypting the data N times using each of the N responses and storing the N resulting cipher texts. When the protected data is to be decrypted, the N responses (keystreams) are again generated by the PUF 3 from the N seeds that were used for encryption. Each of the N stored cipher texts is decrypted using the corresponding response. The earlier described majority voting may then be applied to the resulting N plaintexts in order to correct faults.

In such embodiments, the data is protected by storing the N responses. When the protected data is to be decrypted, the N responses are decrypted and the faults are then corrected.

In some embodiments, the protecting 23 comprises combining the data with the response from the PUF 3 into a cipher text.

In various embodiments, the method 20 comprises inputting to the PUF 3 a challenge and combining the response from the PUF with a cipher text of data previously protected by the device 1 to decrypt the data. In response, the PUF outputs the data decrypted.

In various embodiments, the method 20 comprises integrity protecting the data by:
 inputting the data to the PUF 3 as data block partitions,
 obtaining from the PUF 3 a response to each data block partition in succession, and
 combining the sequence of responses to data block partitions into a first integrity protection tag.

In a variation of the above embodiment, the method 20 comprises verifying integrity of protected data by:
 inputting the protected data to the PUF 3 as data block partitions and obtaining from the PUF 3 a response to each data block partition in succession, and combining the sequence of responses to the data block partitions into a second integrity protection tag, and
 verifying integrity for the case that the second integrity protection tag is equal to the first integrity protection tag.

Figure 5:
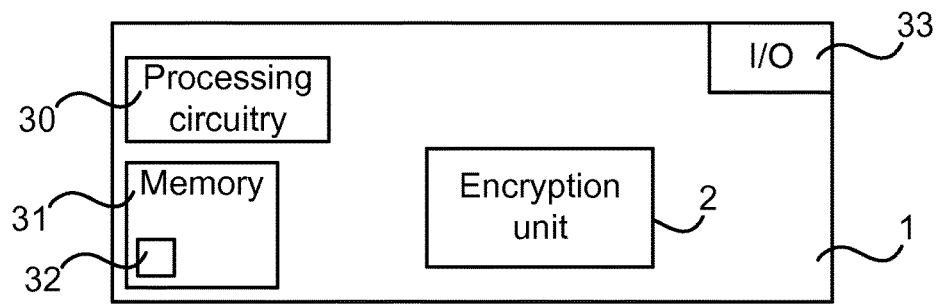
FIG. 5 illustrates schematically a device and means for implementing embodiments in accordance with the present teachings.

FIG. 5 illustrates schematically a device and means for implementing embodiments in accordance with the present teachings. The device 1 comprises processing circuitry 30, which may be any combination of one or more of a suitable central processing unit (CPU), multiprocessor, microcontroller, digital signal processor (DSP), etc., capable of executing software instructions stored in a computer program product 31, e.g. in the form of a storage medium 31. The processing circuitry 30 may further be provided as at least one application specific integrated circuit (ASIC), or field programmable gate array (FPGA).

The processing circuitry 30 is configured to cause the device 1 to perform a set of operations, or steps, e.g. as described in relation to FIG. 4. For example, the storage medium 31 may store the set of operations, and the processing circuitry 30 may be configured to retrieve the set of operations from the storage medium 30 to cause the device 1 to perform the set of operations. The set of operations may be provided as a set of executable instructions. The processing circuitry 30 is thereby arranged to execute methods as disclosed herein.

The storage medium 31 may also comprise persistent storage, which, for example, can be any single one or combination of magnetic memory, optical memory, solid state memory or even remotely mounted memory.

The device 1 may also comprise an input/output device 33 for communicating with other entities and devices, e.g. with an external database 5. The input/output device 33 may be an interface and may, for instance, comprise a protocol stack, for communication with other devices or entities. The input/output device 33 may be used for receiving data input and for outputting data.

The device 1 comprises an encryption unit 2 as has been described e.g. in relation to FIG. 3. The device 1 may further comprise the PUF 3, the expander 4, the fault-tolerance control block, the combiner 7, the plain text serializer and the control block 9 that have all been described herein.

A device 1 is provided for protecting data, in particular for encryption and/or integrity protecting the data. The device 1 is configured to:
 input, to a Physically Unclonable Function, PUF, 3, of the device 1, a challenge,
 obtain, from the PUF 3, a response, and
 protect the data by using the response.

The device 1 may be configured to perform the above steps e.g. by comprising processing circuitry 30 and memory 31, the memory 31 containing instructions executable by the processing circuitry 30, whereby the device 1 is operative to perform the steps. That is, in an embodiment, a device 1 is provided. The device 1 comprises processing circuitry 30 and memory 31, the memory 31 containing instructions executable by the processing circuitry 30, whereby device 1 is operative to: input, to a Physically Unclonable Function, PUF, of the device, a challenge; obtain, from the PUF, a response; and protect the data by using the response.

In an embodiment, the device 1 is configured to, before the inputting, receive a seed and expanding the seed into the challenge.

In some embodiments the device 1 is configured to repeat the obtaining N times for the seed providing N responses, the device 1 being configured to, before the protecting, use the N responses to correct faults and providing based thereon the response.

In various embodiments the device 1 is configured to repeat the inputting N times for different seeds, and configured to obtain N responses, and configured to protect the data N times by encrypting the data N times using each of the N responses and configured to store the N resulting cipher texts.

In various embodiments the device 1 is configured to protect by combining the data with the response from the PUF 3 into a cipher text.

In various embodiments the device 1 is configured to input to the PUF 3 a challenge and to combine the response from the PUF with a cipher text of data previously protected by the device 1 to decrypt the data.

In various embodiments the device 1 is configured to integrity protect the data by:
 inputting the data to the PUF 3 as data block partitions,
 obtaining from the PUF 3 a response to each data block partition in succession, and
 combining the sequence of responses to data block partitions into a first integrity protection tag.

In various embodiments the device 1 is configured to verify integrity of protected data by:
 inputting the protected data to the PUF 3 as data block partitions and obtaining from the PUF 3 a response to each data block partition in succession, and combining the sequence of responses to the data block partitions into a second integrity protection tag, and
 verifying integrity for the case that the second integrity protection tag is equal to the first integrity protection tag.

Figure 6:
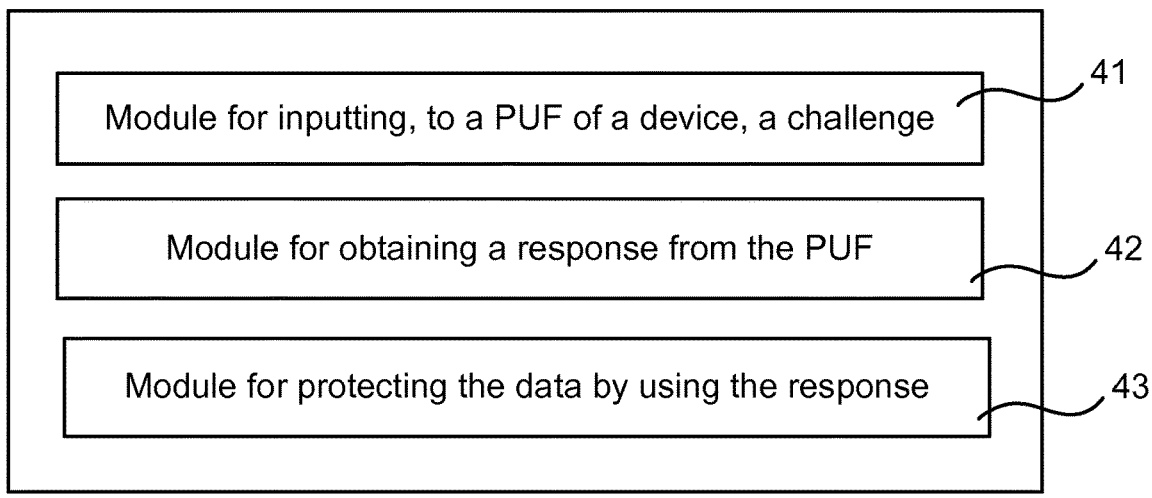
FIG. 6 illustrates a device comprising function modules/software modules for implementing embodiments of the present teachings.

FIG. 6 illustrates a device comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 20 that has been described in various embodiments.

A device 1 is provided for protecting data. The device 1 comprises a first module 41 for inputting, to a Physically Unclonable Function, PUF, of the device 1 a challenge. The first module 41 may, for instance, comprise an input device for receiving data.

The device 1 comprises a second module 42 for obtaining from the PUF, a response. The second module 42 may, for instance, comprise an output device by means of which the response is received from the PUF.

The device 1 comprises a third module 43 for protecting the data by using the response. The third module 43 may, for instance, comprise processing circuitry adapted for data protection.

It is noted that one or more of the modules 41, 42, 43 may be replaced by units.

Figure 7:
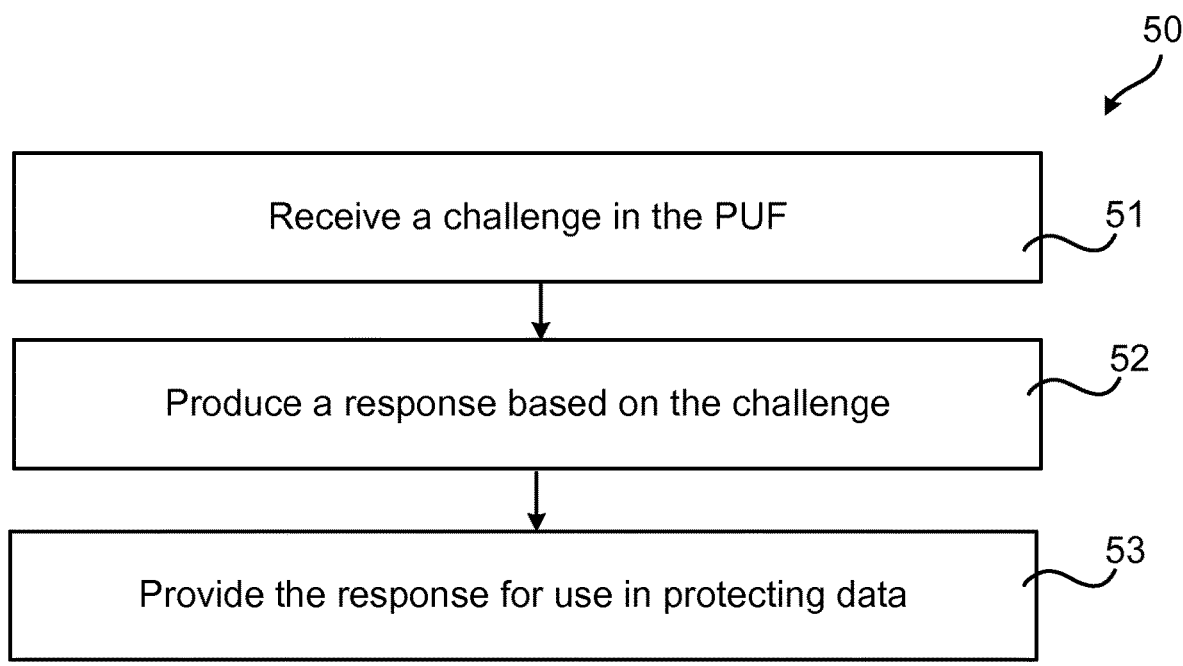
FIG. 7 illustrates a flow chart over steps of embodiments of a method in an encryption black-box in accordance with the present teachings.

FIG. 7 illustrates a flow chart over steps of embodiments of a method in an encryption black-box in accordance with the present teachings. The method 50 is performed by an encryption unit 2 for use in protecting data. The encryption unit 2 comprises a Physically Unclonable Function, PUF, 3. The method 50 comprises receiving 51, in the PUF 3, a challenge; producing 52, based on the challenge, a response; and providing 53 the response for use in protecting data. The encryption unit 2 may, as has been described e.g. in relation to FIG. 3, comprise various parts, but at a minimum it comprise the PUF. In essence then, a PUF is used as an encryption black-box, i.e. used for encryption and/or integrity protection. Unlike known methods for implementing encryption black-boxes, the present method uses a PUF to implement key storage/generation and keystream generation in an encryption black-box.

In an embodiment, the method 50 comprises receiving, in the PUF 3, a challenge and combining the response from the PUF 3 with a cipher text of data previously protected by the PUF 3 and outputting the data decrypted.

In prior art, PUFs have been used for key storage/generation for the traditional encryption algorithms. In these cases, as well as in applications which use PUFs for challenge-response authentication or device identification, after a PUF is manufactured, it has to be enrolled by either constructing a model of the PUF, or by generating and storing a database of challenge-response pairs. In the present application, if a non-modellable PUF is used, then it does not need to be enrolled in any way, which is a great advantage because it saves a lot at time and effort. The omitted need for PUFs enrollment is a new feature compared to the ways PUFs have been used.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed by a device for protecting data, the method comprising:
    expanding N different seeds into N challenges;
    inputting, to a single Physically Unclonable Function, PUF, of the device, the N challenges;
    obtaining, from the PUF, N responses for the N different seeds;
    protecting the data by using the response,
    wherein protecting the data comprises encrypting the data N times using each of the N responses to result in N cipher texts and storing the N cipher texts;
    decrypting each of the N stored cipher texts to result in N plaintexts, wherein decrypting each of the N stored cipher texts comprises the PUF generating N responses for the N different seeds and using the N generated responses to decrypt the N stored cipher texts; and
    applying majority voting to the N plaintexts to correct faults.

2. The method as claimed in claim 1, comprising integrity protecting the data by: inputting the data to the PUF as data block partitions; obtaining from the PUF a response to each data block partition in succession; and combining the sequence of responses to data block partitions into a first integrity protection tag.

3. The method as claimed in claim 2, comprising verifying integrity of protected data by: inputting the protected data to the PUF as data block partitions and obtaining from the PUF a response to each data block partition in succession, and combining the sequence of responses to the data block partitions into a second integrity protection tag; and verifying integrity for a case that the second integrity protection tag is equal to the first integrity protection tag.

4. A computer program product for a device comprising a non-transitory computer-readable medium storing a computer program comprising computer program code, which, when run on processing circuitry of the device causes the device to perform the method comprising:
    expanding N different seeds into N challenges;
    inputting, to a single Physically Unclonable Function, PUF, of the device, the N challenges;
    obtaining, from the PUF, N responses for the N different seeds;
    protecting the data by using the response,
    wherein protecting the data comprises encrypting the data N times using each of the N responses to result in N cipher texts and storing the N cipher texts;
    decrypting each of the N stored cipher texts to result in N plaintexts, wherein decrypting each of the N stored cipher texts comprises the PUF generating N responses for the N different seeds and using the N generated responses to decrypt the N stored cipher texts; and
    applying majority voting to the N plaintexts to correct faults.

5. A device for protecting data, the device being configured to:
    expanding N different seeds into N challenges;
    input, to a single Physically Unclonable Function, PUF, of the device, the N challenges;
    obtain, from the PUF, N responses for the N different seeds;
    protect the data by using the response, wherein protecting the data comprises encrypting the data N times using each of the N responses to result in N cipher texts and storing the N cipher texts;
    decrypt each of the N stored cipher texts to result in N plaintexts, wherein decrypting each of the N stored cipher texts comprises the PUF generating N responses for the N different seeds and using the N generated responses to decrypt the N stored cipher texts; and
    apply majority voting to the N plaintexts to correct faults.

6. The device as claimed in claim 5, configured to integrity protect the data by: inputting the data to the PUP as data block partitions; obtaining from the PUF a response to each data block partition in succession; and combining the sequence of responses to data block partitions into a first integrity protection tag.

7. The device as claimed in claim 6, configured to verify integrity of protected data by: inputting the protected data to the PUF as data block partitions and obtaining from the PUF a response to each data block partition in succession, and combining the sequence of responses to the data block partitions into a second integrity protection tag; and verifying integrity for a case that the second integrity protection tag is equal to the first integrity protection tag.

* * * * *